(12) United States Patent
Navon et al.

(10) Patent No.: US 11,334,280 B2
(45) Date of Patent: May 17, 2022

(54) STORAGE DEVICE FEATURE EXTRACTION OPTIMIZATION

(71) Applicant: Western Digital Technologies, Inc., San Jose, CA (US)

(72) Inventors: Ariel Navon, Revava (IL); Alexander Bazarsky, Holon (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 6 days.

(21) Appl. No.: 16/917,231

(22) Filed: Jun. 30, 2020

(65) Prior Publication Data
US 2021/0405911 A1    Dec. 30, 2021

(51) Int. Cl.
*G06F 3/06* (2006.01)
*G06K 9/62* (2006.01)

(52) U.S. Cl.
CPC .......... *G06F 3/0653* (2013.01); *G06F 3/0619* (2013.01); *G06F 3/0646* (2013.01); *G06F 3/0673* (2013.01); *G06K 9/6227* (2013.01); *G06K 9/6234* (2013.01); *G06K 9/6247* (2013.01)

(58) Field of Classification Search
None
See application file for complete search history.

(56) References Cited

U.S. PATENT DOCUMENTS

| | | | |
|---|---|---|---|
| 2017/0045356 A1* | 2/2017 | Pandev | G01B 21/042 |
| 2018/0074973 A1* | 3/2018 | Chan | G06F 11/00 |
| 2018/0267810 A1* | 9/2018 | Madpur | G06F 1/04 |
| 2019/0140838 A1 | 5/2019 | Bernat et al. | |
| 2019/0155682 A1 | 5/2019 | Sinha et al. | |
| 2019/0319977 A1 | 10/2019 | Gottschlich et al. | |
| 2021/0089226 A1* | 3/2021 | Swaminathan | G06F 3/061 |
| 2021/0117799 A1* | 4/2021 | Faibish | G06N 3/0454 |
| 2021/0264294 A1* | 8/2021 | Zheng | G06N 20/00 |

OTHER PUBLICATIONS

N. V. Boulgouris; Konstantinos N. Plataniotis; Evangelia Micheli-Tzanakou, "Discriminant Analysis for Dimensionality Reduction: An Overview of Recent Developments," in Biometrics: Theory, Methods, and Applications, IEEE, 2010, pp. 1-19 (Year: 2010).*
Unknown, Base Specification, NVM Express Revision 1.4, Jun. 10, 2019 (10 pages), NVM Express Workgroup c/o VTM, Inc., Beaverton, OR.

* cited by examiner

*Primary Examiner* — Edward J Dudek, Jr.
*Assistant Examiner* — Ralph A Verderamo, III
(74) *Attorney, Agent, or Firm* — Patent Law Works LLP (57) ABSTRACT

Systems and methods for compacting and anonymizing telemetry data in a storage system. A controller of a storage device may generate telemetry data based on collected features indicative of the performance of the storage device. The controller may store the telemetry data in the telemetry memory of the storage device. The controller may then transform the telemetry data into transformed telemetry data based on a dimension reduction algorithm, and transmit the transformed telemetry data to the host device.

20 Claims, 5 Drawing Sheets

STORAGE DEVICE FEATURE EXTRACTION OPTIMIZATION

TECHNICAL FIELD

The present disclosure generally relates to data storage systems and, more particularly, to processing feedback from data storage systems.

BACKGROUND

A storage system may include a host system and a storage device. The storage device may be configured to generate metrics including an event data log, statistics, and other data related to the internal operation of the storage device. Such metrics are referred to herein as telemetry data. For example, a storage device may generate telemetry data corresponding to hardware elements, errors, or alerts raised by the storage device. In another example, a storage device may generate telemetry data for performing testing, debugging, and tracing activities. The storage device may store the telemetry data within a memory device of the storage device for later retrieval and analysis.

Retrieval of the telemetry data may impact throughput of the storage system when the amount of telemetry data is voluminous. Further, telemetry data may include confidential or proprietary performance information relating to the storage device. Accordingly, a need exists for managing the telemetry data to prevent undesirable impacts to the storage system.

SUMMARY

Various aspects for storage device feature extraction improvement in a storage system, are described.

One general aspect includes a system including a memory device in a storage device configured to store and retrieve data in response to commands from a host device, a telemetry memory in the storage device configured to store telemetry data, and a controller in the storage device configured to: generate the telemetry data based on collected features indicative of the performance of the storage device, store the telemetry data in the telemetry memory of the storage device, transform the telemetry data into transformed telemetry data based on a dimension reduction algorithm, and transmit the transformed telemetry data to the host device.

In one implementation, the dimension reduction algorithm is a linear algorithm. In another implementation, the dimension reduction algorithm is one of a Principal Component Analysis (PCA) algorithm, a Linear Discriminant Analysis (LDA) algorithm, a Generalized Discriminant Analysis (GDA) algorithm, and a kernel PCA algorithm. In yet another implementation, the dimension reduction algorithm is a non-linear algorithm. In yet a further implementation, the controller is further configured to: receive a selection of the collected features from the host device, and transform ones of the telemetry data corresponding to the selection of the collected features into transformed telemetry data based on a dimension reduction algorithm used to compact the telemetry data.

In further implementations, the controller is further configured to compact the telemetry data to reduce the size to form the transformed telemetry data. In yet further implementations, the controller is further configured to aggregate after compacting the telemetry data to anonymize an identity of the storage device to form the transformed telemetry data.

In yet further implementations, the controller is further configured to: receive a telemetry request from the host device, and transmit in response to receiving the telemetry request, the transformed telemetry data to the host device. In a yet further implementation, the controller is further configured to receive operational parameters for the storage device, wherein the operational parameters are based on the transformed telemetry data further processed by the host device.

In another general aspect, a computer-implemented method includes generating, by a controller of a storage device, telemetry data based on collected features indicative of the performance of the storage device; storing the telemetry data in a telemetry memory of the storage device; transforming, by the controller of the storage device, the telemetry data into transformed telemetry data based on a dimension reduction algorithm; and transmitting, by the controller of the storage device, the transformed telemetry data to the host device.

In some implementations, the method includes the dimension reduction algorithm being a linear algorithm. In another aspect, the dimension reduction algorithm is one of a Principal Component Analysis (PCA) algorithm, a Linear Discriminant Analysis (LDA) algorithm, a Generalized Discriminant Analysis (GDA) algorithm, and a kernel PCA algorithm. In another implementation, the dimension reduction algorithm is a non-linear algorithm. In other implementations, the computer-implemented method includes receiving a selection of the collected features from the host device; and transforming, by the controller of the storage device, ones of the telemetry data corresponding to the selection of the collected features into transformed telemetry data based on a dimension reduction algorithm used to compact the telemetry data. In other implementations, the transforming the telemetry data into transformed telemetry data, further comprises compacting the telemetry data to reduce the size to form the transformed telemetry data.

In yet other implementations, the computer-implemented method includes aggregating after compacting the telemetry data to anonymize an identity of the storage device to form the transformed telemetry data. Further implementations include the transmitting the transformed telemetry data to the host device, comprises: receiving, at the controller of the storage device, a telemetry request from the host device, and transmitting, by the controller of the storage device in response to receiving the telemetry request, the transformed telemetry data to the host device.

In further implementations, the computer-implemented method includes receiving, at the controller of the storage device, operational parameters for the storage device, wherein the operational parameters are based on the transformed telemetry data further processed by the host device. Further implementations include the operational parameters including at least one of: partition sizes of mixed level memory devices in the storage device; memory device wear balancing parameters; and programming rate parameters of memory devices in the storage device.

In another general aspect, a system includes a memory device in a storage device configured to store and retrieve data in response to a host device; a telemetry memory in the storage device configured to store telemetry data; and means for generating the telemetry data based on collected features indicative of the performance of the storage device; means for storing the telemetry data in the telemetry memory of the storage device; means for transforming the telemetry data into transformed telemetry data based on a dimension reduction algorithm; and means for transmitting the transformed telemetry data to the host device.

The various embodiments advantageously apply the teachings of transforming the telemetry data into compacted telemetry data that is anonymized with respect to vendor-identifying features. By compacting the amount of telemetry data that is passed to the host, the telemetry bandwidth is reduced and allows for the optimization of feature extraction by specifying collected features that are important to a storage system. That is, the various embodiments disclosed herein include hardware and/or software with functionality to improve the processing of telemetry data in storage systems. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
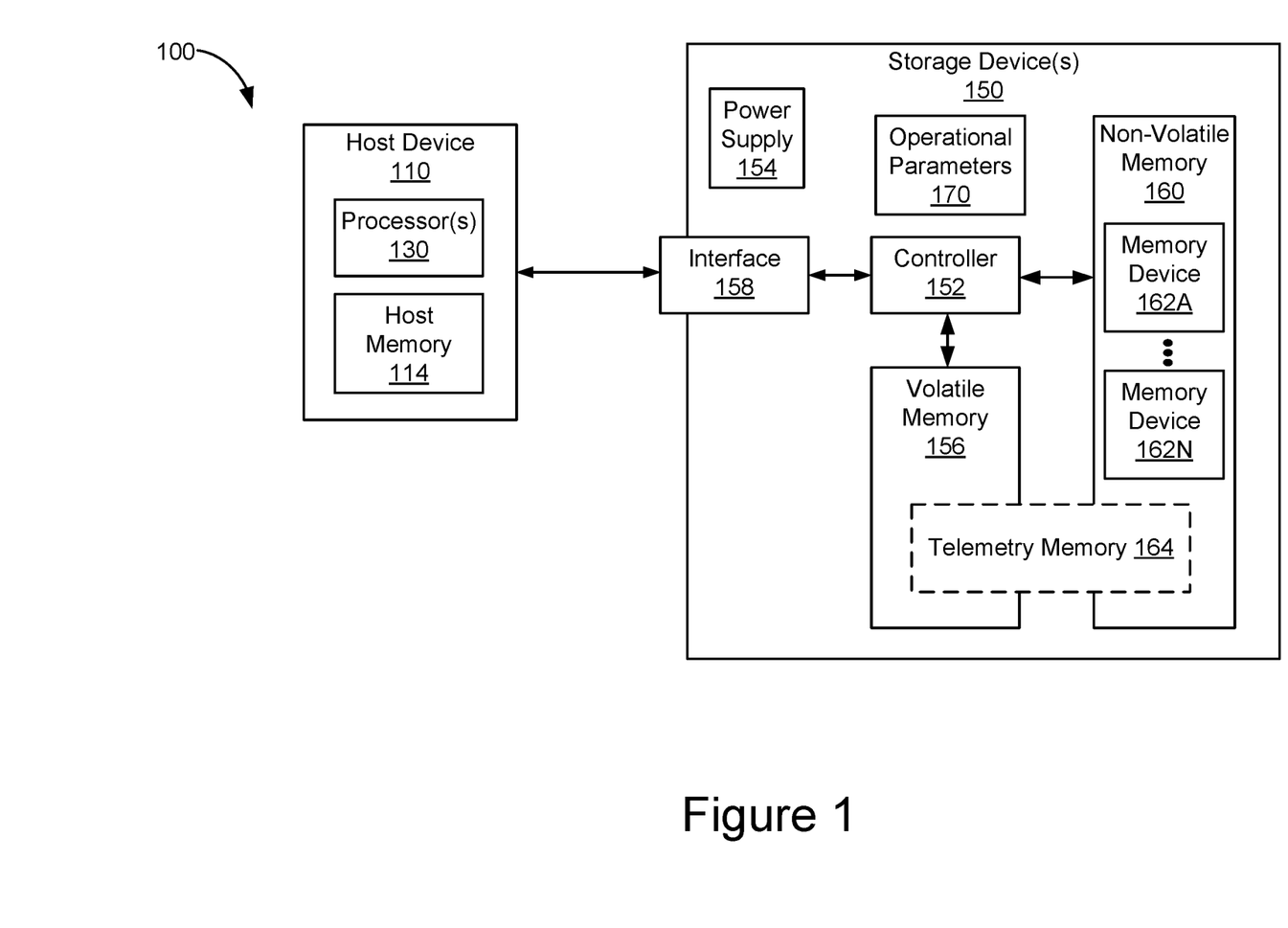
FIG. 1 schematically illustrates a distributed storage and processing system.

FIG. 1 is a conceptual and schematic block diagram illustrating an example storage system 100 in which a host device 110 interfaces with one or more storage devices 150 in an arrangement for storing and retrieving data. For instance, host device 110 may store data to and/or retrieve data from one or more storage devices 150. In some examples, the storage system 100 may include a plurality of storage devices, such as storage device 150, which may operate as a storage array. For instance, storage system 100 may include a plurality of storage devices 150 configured as a redundant array of inexpensive/independent disks (RAID) that collectively function as a mass storage device for host device 110.

A host device 110 may include any computing device, including, for example, a computer server, a network attached storage (NAS) unit, a desktop computer, a notebook (e.g., laptop) computer, a tablet computer, a set-top box, a mobile computing device such as a "smart" phone, a television, a camera, a display device, a digital media player, a video gaming console, a video streaming device, or the like. The host device 110 may include at least one processor 112 and host memory 114. At least one processor 112 may include any form of hardware capable of processing data and may include a general purpose processing unit (such as a central processing unit (CPU)), dedicated hardware (such as an application specific integrated circuit (ASIC)), configurable hardware (such as a field programmable gate array (FPGA)), or any other form of processing unit configured by way of software instructions, microcode, firmware, or the like. Host memory 114 may be used by host device 110 to store information (e.g., temporarily store information). In some examples, host memory 114 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

As illustrated in FIG. 1, storage device 150 may include a controller 152, non-volatile memory (NVM) 160, power supply 154, volatile memory 156, and an interface 158. In some examples, storage device 150 may include additional components not shown in FIG. 1 for the sake of clarity. For example, storage device 150 may include a printed board (PB) to which components of storage device 150 are mechanically attached and which includes electrically conductive traces that electrically interconnect components of storage device 150, or the like. In some examples, the physical dimensions and connector configurations of storage device 150 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.), M.2, or the like. In some examples, storage device 150 may be directly coupled (e.g., directly soldered) to a motherboard of host device 110.

The storage device 150 may include an interface 158 for interfacing with host device 110. Interface 158 may include one or both of a data bus for exchanging data with host device 110 and a control bus for exchanging commands with host device 110. Interface 158 may operate in accordance with any suitable protocol. For example, as described in more detail herein, interface 158 may operate according to the Non-Volatile Memory Express (NVMe™) protocol. However, in other examples, the techniques of this disclosure may apply to an interface 158 that operates in accordance with one or more protocols that support the exchange of telemetry data. The interface 158 (e.g., the data bus, the control bus, or both) is electrically connected to controller 152, providing a communication channel between host device 110 and controller 152, allowing data to be exchanged between host device 110 and controller 152. In some examples, the electrical connection of interface 158 may also permit storage device 150 to receive power from host device 110.

Storage device 150 may include volatile memory 156, which may be used by controller 152 to store information, such as programmable instructions. In some examples, controller 152 may use volatile memory 156 as a cache. For instance, controller 152 may store cached information in volatile memory 156 until the cached information is written NVM 160. Volatile memory 156 may consume power received from power supply 154. Examples of volatile memory 156 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

Storage device 150 may include power supply 154, which may provide power to one or more components of storage device 150. When operating in a standard mode, power supply 154 may provide power to the one or more components using power provided by an external device, such as host device 110. For instance, power supply 154 may provide power to the one or more components using power received from host device 110 via interface 158. In some examples, power supply 154 may include one or more power storage components configured to provide power to the one or more components when operating in a shutdown mode, such as where power ceases to be received from the external device. In this way, power supply 154 may function as an onboard backup power source. Some examples of the one or more power storage components include, but are not limited to, capacitors, super capacitors, batteries, and the like.

Storage device 150 includes NVM 160, which includes a plurality of memory devices 162A-162N (collectively, "memory devices 162"). Each of memory devices 162 may be configured to store and/or retrieve data. For instance, a memory device of memory devices 162 may receive data and a message from controller 152 that instructs the memory device to store the data. Similarly, the memory device of memory devices 162 may receive a message from controller 152 that instructs the memory device to retrieve data. In some examples, each of memory devices 162 may be referred to as a die. In some examples, a single physical chip may include a plurality of dies (i.e., a plurality of memory devices 162). In some examples, each of memory devices 162 may be configured to store relatively large amounts of data (e.g., 128 MB, 512 MB, IGB, 4 GB, 16 GB, 64 GB, 128 GB, 512 GB, 1 TB, etc.). NVM 160 may include any type of non-volatile memory devices. Some examples of NVM 160 include, but are not limited to flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices. Other examples of NVM 10 can include magnetic media, optical disks, floppy disks, flash memories, or forms of electrically programmable memories (EPROM) or electrically erasable and programmable memories (EEPROM). NVM 160 may be one or more magnetic platters in storage device 150, each platter containing one or more regions of one or more tracks of data. Further, the memory devices 162 may also be configured as NAND flash including Single Level Cell (SLC) NAND configured to store one bit per cell, and Triple Level Cell (TLC) NAND flash configured to store three bits per cell.

In some examples, storage device 150 may include telemetry memory 164 that is comprised of storage resources from at least a portion of volatile memory 156, at least a portion of non-volatile memory 160, or both. Storage device 150 uses telemetry memory 164 to support the primary activity of storing information, e.g., for host device 110. For example, storage device 150 may use telemetry memory 164 to temporarily store telemetry data generated during operations of storage device 150, as described in greater detail herein.

Storage device 150 includes controller 152, which may manage one or more operations of storage device 150. For instance, controller 152 may manage the reading of data from and/or the writing of data to memory devices 162. Controller 152 may represent one of or a combination of one or more of a microprocessor, digital signal processor (DSP), application specific integrated circuit (ASIC), field programmable gate array (FPGA), or other digital logic circuitry.

Storage device 150 may include operational parameters 170 for configuring the memory devices 162 of FIG. 1. The operational parameters 170 may configure various aspects of the specific memory devices including single level cell (SLC) and triple level cell (TLC) parameters. Operational parameters 170 may also provide configuration for other aspects of memory devices 162.

In some examples, controller 152 may generate telemetry data associated with storage device 150 and store the telemetry data in a memory device (e.g., telemetry memory 164) of storage device 150. For example, controller 152 may generate telemetry data that includes internal event logs corresponding to operations performed by storage device 150 and store the telemetry data within a designated portion of telemetry memory 164 (e.g., a location within volatile memory 156, in a location within non-volatile memory 160, or some combination of both). Controller 152 may be configured to generate asynchronous events to notify host device 110 of status, error, and health information related to storage device 150 as such events occur.

According to some examples of the present disclosure, controller 152 may determine telemetry data for storage within telemetry memory 164. Generally, telemetry data enables manufacturers to collect internal data logs to improve the functionality and reliability of products such as storage devices 150. The telemetry data may be the vendor-specific data related to storage device 150. In operation, the telemetry data is returned to the host device 110. The telemetry data may be used by the host device 110 for many purposes such as providing storage device performance data to the host for optimization or to a manufacture of the storage device for optimization.

Large-scale or fleet deployments of storage devices may prefer to avoid receiving specific messages including the telemetry data from the storage device. Alternatively, such large-scale deployments a prefer to receive specific telemetry data and apply their own machine learning algorithms to decide how to handle and manage the storage devices.

The telemetry data may identify various performance features are operational parameters in the storage device 150. For example, the collective features of the telemetry data may include memory device performance such as programming time, read time, erase time, bit error rate, and various aggregations of the same including calculations of means, variances, and percentiles. The collective features of the telemetry data may also include an aggregation of error correction coding profile and may include data cell programming trims for single level cells and triple level cells. Other collected features of the telemetry data may include special calibration rates, exception rates, power consumption data, and temperature data.

While the goal of feature collection may differ, their practical limitations related to the collection of telemetry data. First, collection and transmission of telemetry data may impact the available bandwidth between host device 110 and the storage device 150. Therefore, there would be an advantage to compact the telemetry data passed from the storage device 150 to the host device 110. Bypassing only the most important parameters, the overhead caused by feature collection to form the telemetry data may be reduced while still providing desirable feedback to the host device. Second, the collective features relating to performance of the storage device are often confidential and may be undesirably transmitted beyond the host device allowing a competitor of the manufacture of the storage device 150 to be privy to confidential performance information.

Accordingly, the compaction of the telemetry data may desirably reduce the amount of data transmitted between the storage device 150 and the host device 110. Further, aggregating the collected features may scrub or sanitize under specific information on the telemetry data thereby preserving confidentiality of vendor-specific collected features.

In some examples, controller 152 of storage device 150 may generate telemetry data based on collected features indicative of the performance of the storage device 150. The telemetry data may be stored in telemetry memory 164 of storage device 150. The controller 152 of storage device 150 may transform the telemetry data into transformed telemetry data based upon a dimension reduction algorithm. The controller 152 of storage device 150 may transmit the transformed telemetry data to the host device 110.

Accordingly, the described techniques improve the transfer of telemetry data by performing mathematical transformation on the collected features of the telemetry data to create the transformed telemetry data. The collected features may also be aggregated to anonymize the collected features. By performing a transformation of the telemetry data, the size of the data that is passed from the storage device 150 to the host device 110 is reduced and also obfuscates the collected features such that the host device 110 is unable to reveal the specific identities of the collected features.

In some examples, the features of the telemetry data may be extracted and processed by a mathematical transformation which aggregates the features into anonymous features containing only the most significant portion of the original features. By including only the most significant portions of the original features, the overall size of the generated telemetry data is reduced, thereby reducing the overhead bandwidth associated with telemetry reporting. Further, the mathematical transformation of the extracted features also obfuscates the features such that the host device 110 is incapable of overtly or inadvertently revealing confidential information relating to the feature received in the telemetry data.

The examples as described herein, are useful in both standalone systems that use an NVMe standard to collect telemetry data. As stated, the examples also apply a mathematical transformation to the collected features such that they are compacted into a smaller number of aggregated features. These aggregated features are based on applying a designated transformation on the original collected features such that almost all the information encapsulated in the original features is preserved.

In other examples, the number or quantity of dominant features may be selected dynamically by the host device, based on the host device's current needs. That is to say, the host device may choose to collect features after an elapsed time or whenever an open management slot is available. In one aspect, the transformation may be performed by a Principal Component Analysis (PCA). The PCA is an algebraic calculus method that produces a linear transformation of the original features such that the produced aggregated transformed features contain a condensed information in a smaller number of features. In one aspect, the PCA algorithm calculates systemic covariance matrix, diagonalizes the matrix, and uses the eigenvectors and eigenvalues of the matrix. The eigenvectors with the highest eigenvalues of the diagonalizes the covariance matrix are the most dominant PCA vectors which are selected as the features to pass to the host.

In other examples, dimension reduction algorithms, such as Linear Discriminant Analysis (LDA), kernel PCA, and Generalized Discriminant Analysis (GDA) are contemplated. Further, non-linear algorithms are also contemplated and may enable execution of or complex transformations.

In other examples, storage device characteristics may be determined by analyzing the telemetry data received from the storage device. For example, host devices with control over their workloads made use feedback from the storage device in order to approve write amplification and improve perceived endurance. In operation, the collected features may be aggregated and passed to the host device only when the host device requests the telemetry data. The aggregated feature data from the storage devices may then be fed into a machine learning algorithm within the host device environment in order to derive optimal parameters for device operation. The various examples also find application to workload optimization in composite solid-state drive (cSSD) applications were in the nature of the collected features may be anonymized.

In another example, operational parameters may be optimized according to the various workloads such as in the determination of partition sizes for Single Level Cell (SLC) and Triple Level Cell (TLC) memory devices. For example, SLC memory devices have more endurance and less read/write latency. However, the total storage size is reduced. Further parameter modification may occur to the flash management parameters such as tables, garbage collection schedule, wear-leveling frequency, and open block allocation. The behaviors associated with flash management and be optimized. Further, optimization of the programming rate (E.G., programming trim) and the peak power may be relaxed so that the programming rate will be faster at the expense of an elevated bit error rate in, for example, a Single Level Cell.

The various examples improve the processes for storage devices to collect telemetry data. The telemetry data may then be used to optimize the way the storage devices operate under different workloads, which is important to the operators and manufacturers of host devices and storage devices. Such improvements enable better interaction with host devices that interact with storage devices.

Figure 2:
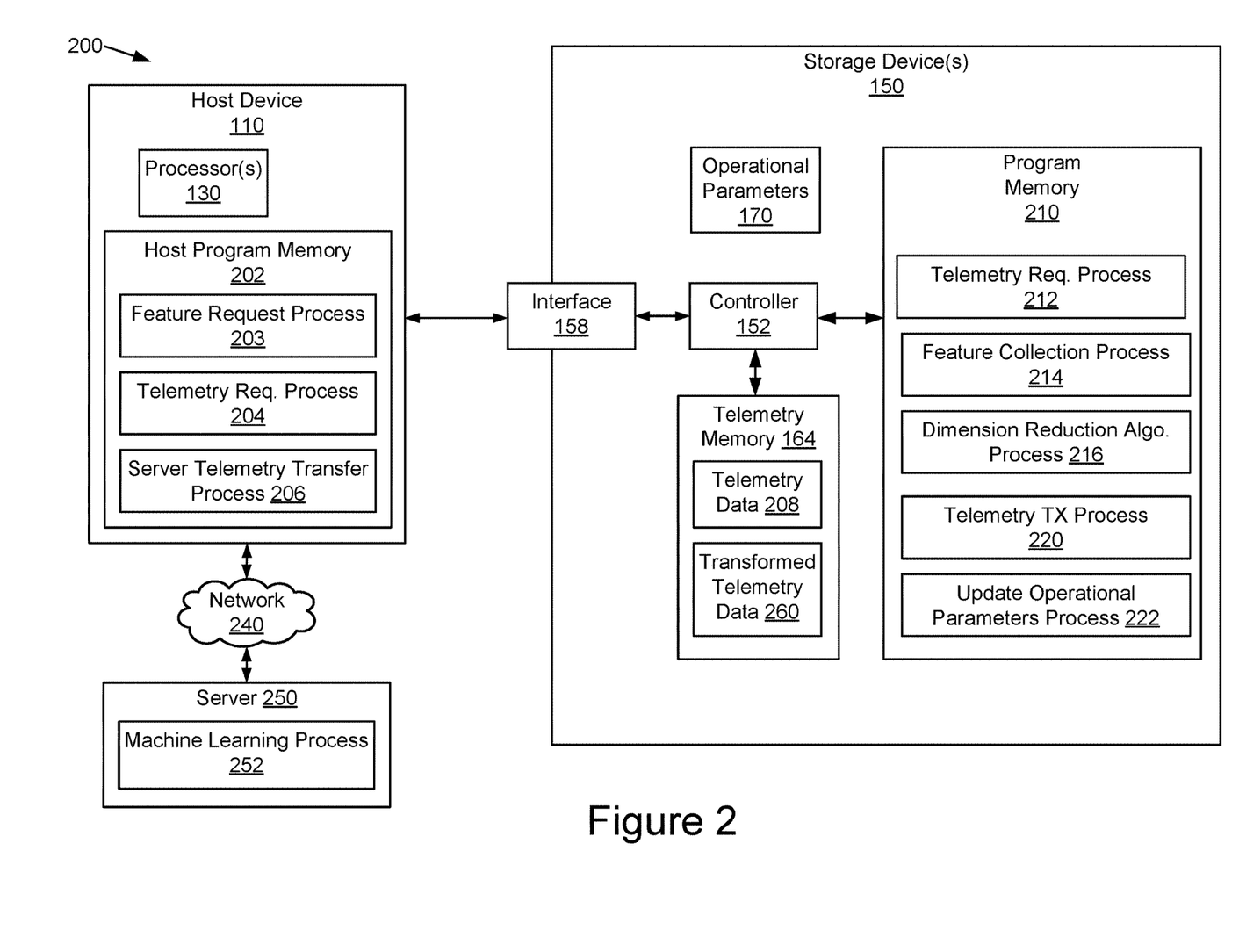
FIG. 2 schematically illustrates a host architecture for function processing that may be used by the system of FIG. 1.

FIG. 2 is a schematic block diagram illustrating an example storage system 200 in which storage device 150 may interact with host device 110, in accordance with one or more techniques of this disclosure. FIG. 2 illustrates and describes conceptual and functional elements of FIG. 1, with concurrent reference to the physical components illustrated in FIG. 1.

Storage device 150 includes telemetry memory 164 allocated for storing telemetry data 208 associated with storage device 150. Storage device 150 may include operational parameters 170 for configuring the memory devices 162 of FIG. 1. The operational parameters 170 may configure various aspects of the specific memory devices including Single Level Cell (SLC) and Triple Level Cell (TLC) parameters. Operational parameters 170 may also provide configuration for other aspects of memory devices 162.

Storage device 150 also includes a controller 152, as described above with respect to FIG. 1, which executes programs and processes stored in storage device program memory 210. Similarly, host device 110 also includes a processor 130 for executing programs and processes stored in host program memory 202.

In operation, host device 110 may execute a feature request procedure 203 to communicate, through interface 158, particular features of interest that the storage device 150 should collect. Upon receipt of the feature request, storage device 150 executes a feature collection process 214. Depending upon whether a feature request was received from a host device 110, the storage device may collect more or fewer features with respect to the performance of memory devices 162. The collected features may be stored as telemetry data 208 in telemetry memory 164.

When the host device 110 desires telemetry data, the host device 110 may execute a telemetry request process 204 and may pass the request through interface 158 to storage device 150. The storage device 150 processes the telemetry request in a telemetry request process 212. The storage device 150 generates the telemetry data 208 based on the collected features indicative of the performance of the storage device 150. Storage device 150 executes a dimension reduction algorithm process 216 to transform the telemetry data 208 into transformed telemetry data 260. The transformation of the telemetry data is based on a dimension reduction algorithm which may be one or more of a Principal Component Analysis (PCA) algorithm, a Linear Discriminant Analysis (LDA) algorithm, a Generalized Discriminant Analysis (GDA) algorithm, a non-linear algorithm, a linear algorithm, or other algorithms that provide compaction and/or anonymization of the collected features of the telemetry data.

Storage device 150 may execute a telemetry transmit process 220 for transferring the transformed telemetry data 260 over the interface 158 to the host device 110. In one example, the host device 110 processes and consumes the transformed telemetry data. In another example, the host device 110 executes a server telemetry transfer process 206 and transmits the transformed telemetry data 260 over a network 240 to a server 250. The server 250 may include a machine learning process 252 for further processing the transformed telemetry data 260.

Following processing of the transformed telemetry data 260 by either the host device 110 or the server 250, updated operational parameters may be provided to the storage device 150 over interface 158. The storage device 150 may execute an update operational parameters process 222 to process an update operational parameters 170.

Figure 3:
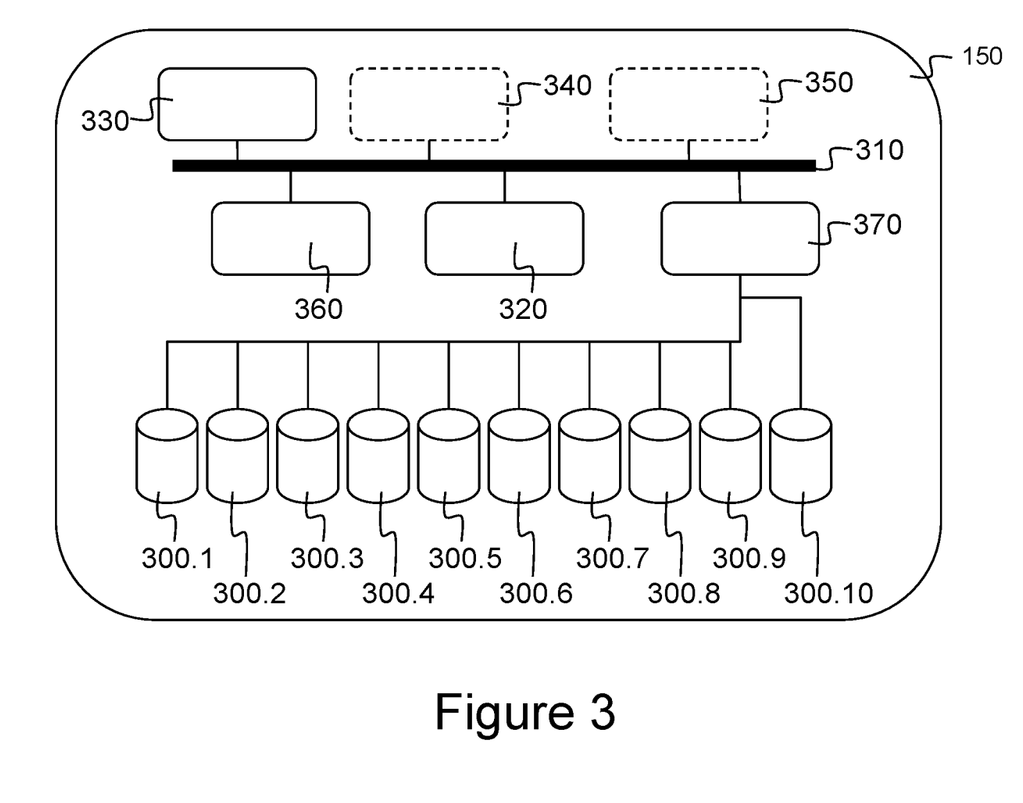
FIG. 3 schematically illustrates a storage device of the system of FIG. 1.

FIG. 3 shows a schematic representation of one of the storage devices 150. Storage device 150 may comprise a bus 310, a controller 320, a local memory 330, one or more optional input units 340, one or more optional output units 350, a communication interface 360, a storage element interface 370 and a plurality of storage elements 300.1-300.10. In some embodiments, at least portions of bus 310, controller 320, local memory 330, communication interface 360, storage element interface 370 may comprise a storage controller or backplane management controller, such as storage controllers 152. Bus 310 may include one or more conductors that permit communication among the components of storage device 150.

Controller 320 may include any type of conventional processor or microprocessor that interprets and executes instructions. Local memory 330 may include a random-access memory (RAM) or another type of dynamic storage device that stores information and instructions for execution by controller 320 and/or a read only memory (ROM) or another type of static storage device that stores static information and instructions for use by controller 320. Input unit 340 may include one or more conventional mechanisms that permit an operator to input information to said storage device 150, such as a keyboard, a mouse, a pen, voice recognition and/or biometric mechanisms, etc.

Output unit 350 may include one or more conventional mechanisms that output information to the operator, such as a display, a printer, a speaker, etc. Communication interface 360 may include any transceiver-like mechanism that enables storage device 150 to communicate with other devices and/or systems, for example mechanisms for communicating with other storage devices 150 or controller nodes 106 such as for example two 1 Gb Ethernet interfaces. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 140, for example, 2 TB SATA-II disk drives or 2 TB NVMe solid-state drives (SSDs), and control the reading and writing of data to/from these storage elements 300. As shown in FIG. 3, such a storage device 150 could comprise ten 2 TB SATA-II disk drives as storage elements 300.1-300.10 and in this way storage device 150 would provide a storage capacity of 20 TB to the storage system 100.

The storage system 100 may comprise a plurality of storage elements 300. The storage devices 150 each comprise a share of these storage elements 300. Each storage devices 150 could comprise a similar amount of storage elements, but this is, however, not essential. Storage device 150 could for example comprise four, eight, ten, or any other number of storage elements appropriate to interface and form factor constraints. The storage system 100 may be operable to store and retrieve a data objects, data blocks, data files, or other data units comprising data, for example, 64 MB of binary data and a location or object identifier for addressing this data unit, for example a universally unique identifier such as a globally unique identifier (GUID).

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces such as for example different revisions of BATA, PATA, SAS, FC, NVMe, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
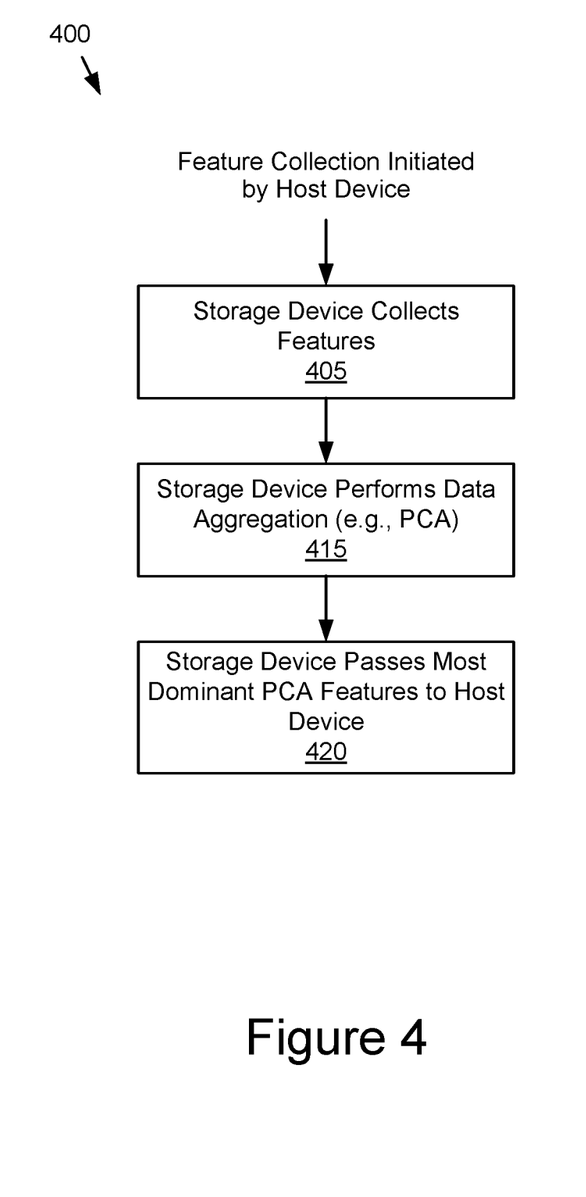
FIG. 4 is a flow diagram illustrating the high-level processing of telemetry data.

FIG. 4 is a flow diagram illustrating high-level processing of telemetry data. In a process 400, feature collection is initiated by a host device 110. In a block 405 the storage device 150 of FIG. 2 collects the various features. As described, the collected features may be greater or fewer depending upon a feature request received from the host device 110.

In a block 415, the storage device 150 performs data transformation by performing data compaction and aggregation, as described herein. As described above, the data transformation occurs by transforming the telemetry data 208 into the transformed telemetry data 260 using one of the dimension reduction algorithm as described herein.

In a block 420, the storage device 150 passes the transformed telemetry data 260 to the host device 110. In one example, the transformed telemetry data may include the transmission of the most dominant, for example, PCA features as determined by, for example, the Principal Component Analysis (PCA) algorithm.

Figure 5:
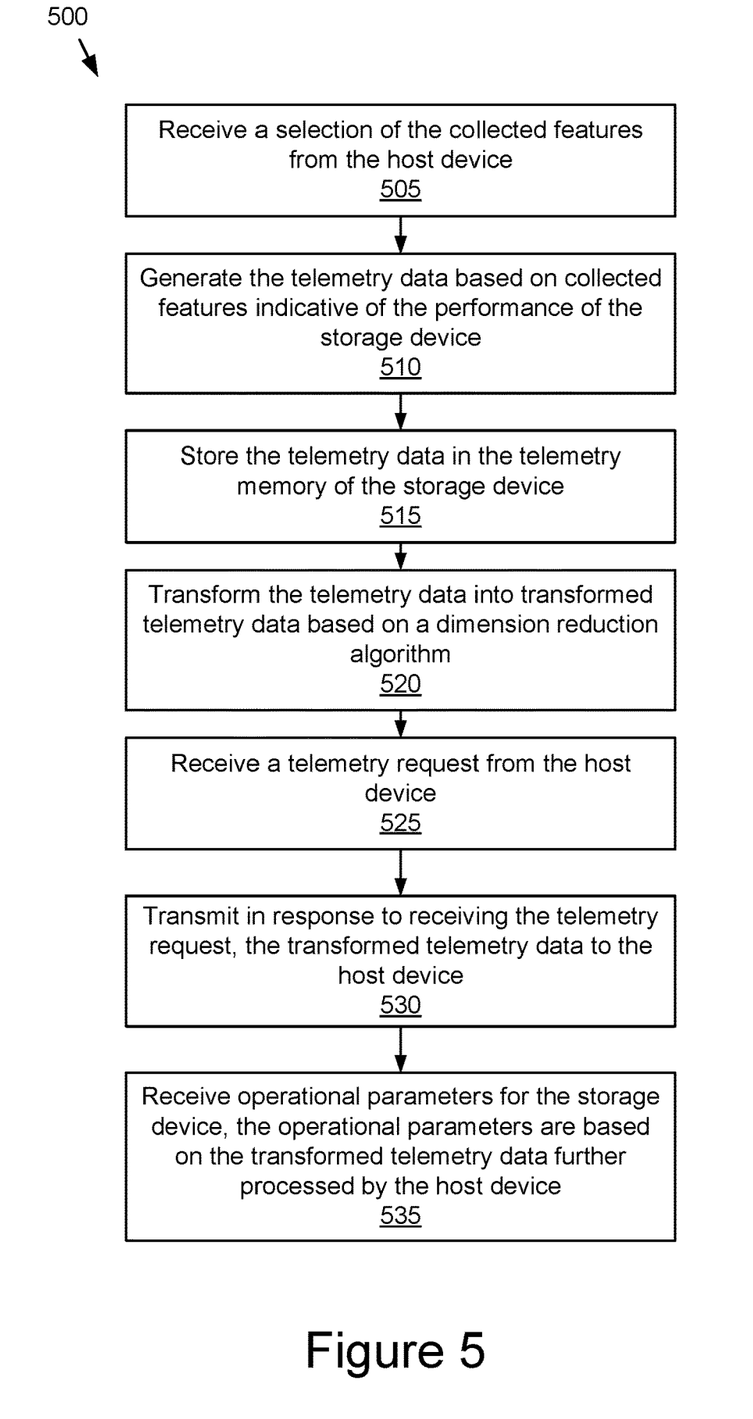
FIG. 5 is a flow diagram illustrating various steps for compacting and anonymizing telemetry data.

FIG. 5 is a flow diagram illustrating various steps for compacting and anonymizing telemetry data, according to the various aspects described herein. In a block 505, a storage device 150 receives the selection of the desired collected features from the host device. As described, the host device 110 or server 250 may indicate to the storage device 150 specific features of interest that are to be collected as telemetry data. When known selection is designated or received by the storage device 150, the storage device 150 may default to the default selection of features for collection.

In a block 510, the storage device 150 generates the telemetry data based on collected features indicative of the performance of the storage device. There are many features that may be collected by the storage device. For example, features may include an aggregation of a memory state such as programming time, read time, erase time, bit error rates, and other performance information relating to the storage devices. Such information may be provided in various statistical forms such as means, variances, and percentiles. Other features may include an aggregation of error correction coding and decoding profiles and various durations of form factors such as you Low Power, Ultra Low Power, and Full Power, as well as soft bit usage rates. Other features that may be collected include special calibration rates exception rates and problematic zones. Power consumption data and temperature data may also be collected.

In a block 515, the collected features are stored as telemetry data 208 in the telemetry memory 164 of the storage device 150. While FIG. 2 illustrates the telemetry memory 164 as being separate, FIG. 1 illustrates that the telemetry memory may be formed from one or both volatile memory 156 or non-volatile memory 160.

In a block 520, the storage device 150 transforms the telemetry data 208 into transformed telemetry data 260 based on a dimension reduction algorithm, as described herein. As stated, the dimension reduction algorithm provides for bandwidth reduction as well as anonymization of the telemetry data.

In a block 525, the storage device 150 receives a telemetry request from the host device 110. As illustrated in the present flow diagram, the collection of features and generation of the telemetry data may be ongoing with the transfer of the telemetry data being conditioned upon a request from the host device. Alternatively, a telemetry request may be received prior to the collection of telemetry information signifying to the storage device to begin collection of features for the formation of telemetry data.

In a block 530, the storage device 150 transmits, in response to receiving the telemetry request, the transformed telemetry data to the host device 110. As stated, the transformed telemetry data 260 as received by the host device may be consumed solely by the host device 110 or may be sent to a server 250 for further processing.

In a block 535, operational parameters for the storage device 150 are received from the host device. The operational parameters are based upon the transformed telemetry data as further processed by the host device 110 or as yet further processed by a server 250.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, microcode, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing.

Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a memory device in a storage device configured to store and retrieve data in response to a host device;
a telemetry memory in the storage device configured to store telemetry data; and
a controller in the storage device configured to:
generate the telemetry data based on original collected features indicative of performance of the storage device;
store the telemetry data in the telemetry memory of the storage device;
compact the telemetry data into transformed telemetry data based on a dimension reduction algorithm, wherein the transformed telemetry data comprises a smaller number of transformed collected features than a number of the original collected features; and
transmit the transformed telemetry data to the host device.

2. The system of claim 1, wherein the dimension reduction algorithm is a linear algorithm.

3. The system of claim 1, wherein the dimension reduction algorithm is one of a Principal Component Analysis (PCA) algorithm, a Linear Discriminant Analysis (LDA) algorithm, a Generalized Discriminant Analysis (GDA) algorithm, and a kernel PCA algorithm.

4. The system of claim 1, wherein the dimension reduction algorithm is a non-linear algorithm.

5. The system of claim 1, wherein the controller is further configured to:
receive a selection of the original collected features from the host device; and
transform selected original collected features of the telemetry data corresponding to the selection of the original collected features into the transformed telemetry data based on the dimension reduction algorithm to compact the telemetry data.

6. The system of claim 5, wherein the selection of the original collected features comprises the number of transformed collected features in the transformed telemetry data.

7. The system of claim 1, wherein the controller is further configured to:
aggregate, after compacting the telemetry data, to anonymize an identity of the storage device to form the transformed telemetry data transmitted to the host device.

8. The system of claim 1, wherein the controller is further configured to:
receive a telemetry request from the host device; and
transmit, in response to receiving the telemetry request, the transformed telemetry data to the host device.

9. The system of claim 1, wherein the controller is further configured to:
receive operational parameters for the storage device, wherein the operational parameters are based on the transformed telemetry data further processed by the host device.

10. A computer-implemented method, comprising:
generating, by a controller of a storage device, telemetry data based on original collected features indicative of performance of the storage device;
storing the telemetry data in a telemetry memory of the storage device;
compacting, by the controller of the storage device, the telemetry data into transformed telemetry data based on a dimension reduction algorithm, wherein the transformed telemetry data comprises a smaller number of transformed collected features than a number of the original collected features; and
transmitting, by the controller of the storage device, the transformed telemetry data to a host device.

11. The computer-implemented method of claim 10, wherein the dimension reduction algorithm is a linear algorithm.

12. The computer-implemented method of claim 10, wherein the dimension reduction algorithm is one of a Principal Component Analysis (PCA) algorithm, a Linear Discriminant Analysis (LDA) algorithm, a Generalized Discriminant Analysis (GDA) algorithm, and a kernel PCA algorithm.

13. The computer-implemented method of claim 10, wherein the dimension reduction algorithm is a non-linear algorithm.

14. The computer-implemented method of claim 10, further comprising:

receiving a selection of the original collected features from the host device; and transforming, by the controller of the storage device, selected original collected features of the telemetry data corresponding to the selection of the original collected features into the transformed telemetry data based on the dimension reduction algorithm to compact the telemetry data.

15. The computer-implemented method of claim 14, wherein the selection of the original collected features comprises the number of transformed collected features in the transformed telemetry data.

16. The computer-implemented method of claim 10, further comprising:

aggregating, after compacting the telemetry data, to anonymize an identity of the storage device to form the transformed telemetry data.

17. The computer-implemented method of claim 10, wherein transmitting the transformed telemetry data to the host device comprises:

receiving, at the controller of the storage device, a telemetry request from the host device; and transmitting, by the controller of the storage device in response to receiving the telemetry request, the transformed telemetry data to the host device.

18. The computer-implemented method of claim 10, further comprising:

receiving, at the controller of the storage device, operational parameters for the storage device, wherein the operational parameters are based on the transformed telemetry data further processed by the host device.

19. The computer-implemented method of claim 18, wherein the operational parameters include at least one of:

partition sizes of mixed level memory devices in the storage device;

memory device wear balancing parameters; and programming rate parameters of memory devices in the storage device.

20. A system, comprising:

a memory device in a storage device configured to store and retrieve data in response to a host device;

a telemetry memory in the storage device configured to store telemetry data;

means, in the storage device, for generating the telemetry data based on original collected features indicative of performance of the storage device;

means for storing the telemetry data in the telemetry memory of the storage device;

means, in the storage device, for compacting the telemetry data into transformed telemetry data based on a dimension reduction algorithm, wherein the transformed telemetry data comprises a smaller number of transformed collected features than a number of the original collected features; and means, in the storage device, for transmitting the transformed telemetry data to the host device.

* * * * *